United States Patent Office 3,296,203
Patented Jan. 3, 1967

3,296,203
PRODUCTION OF DEPOLYMERIZATES FROM POLYMERS CROSS-LINKED BY S(Se, Te) HALIDES
Lev Akobjanoff, 2726 Hillegass Ave., Berkeley, Calif. 94705
No Drawing. Filed May 8, 1961, Ser. No. 108,276
15 Claims. (Cl. 260—48)

This application is a continuation-in-part of my copending application Serial Number 721,081, filed March 13, 1958, now abandoned, which in turn is a continuation-in-part of my application Serial Number 397,032, filed December 8, 1953, now abandoned, which in turn is a continuation-in-part of my application Serial Number 188,477, filed October 4, 1950, now abandoned, which in turn is a continuation-in-part of my application Serial Number 86,126, filed April 7, 1949, now abandoned.

This invention relates to the production of highly reactive organic poly-sulfo (Se, Te) halides by depolymerization of condensates already cross-linked by said halides of the sulfur family. Its essential feature is the use for the depolymerization of these halides in such proportions exceeding the requirements of exhaustive cross-linking of the condensate.

Condensates cross-linked by S(Se, Te) halides have been known for rubber and drying oils since the pioneering work of Henriquez (Chemiker Zeitung 17, 637 and 707 (1893)), Weber (Chemik.-Ztg. 18, 837 (1894)), Bernstein (Kolloid Zeitschrift 11, 185 (1912)), Le Blanc (Koll. Ztsch. 33, 168 (1923)), for polyalcohols and polyketones since the publications of Ellis (Chemistry of Synthetic Resins II, 1061 (1935)) and Stern (USP 1,218,713). The common feature of molecules undergoing cross-linking is the presence of two or more unsaturated constituents reactive with S(Se, Te) halides.

The reaction disclosed herein goes beyond the cross-linking explored by the above authors. Essential for its performance is the novel treatment of organic molecules containing two or more unsaturated constituents such as: multiple bonds, oxygen linkages, nitrogen linkages with halides of sulfur, selenium and tellurium in amounts exceeding one half equivalent of halide per each equivalent of unsaturated constituents of the organic molecules.

(Prior to the reaction disclosed herein the organic molecules must be exhaustively cross-linked. This occurs automatically upon the addition of sulfur(Se, Te) halides by the "below one half equivalent per equivalent of unsaturation" portion of the halide regardless of whether the original organic substance is still monomeric or may have been subjected to condensation, polymerization, vulcanization, etc., of any extent up to — but not beyond — the exhaustive cross-linking.)

In chemical symbols the reaction known to Henriquez and his followers can be represented, for instance by the stages (a) through (c) of the following diagram, while the depolymerization is shown by stage (d)

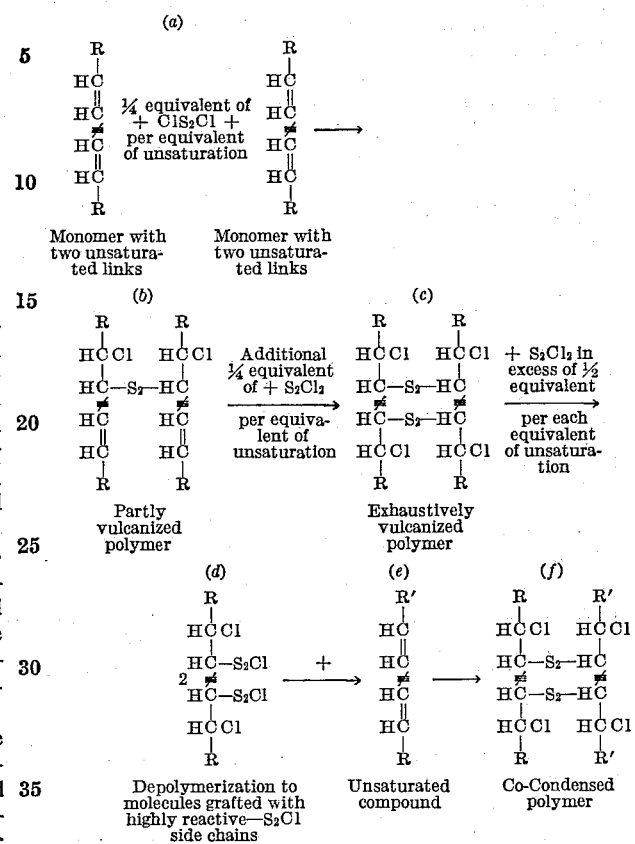

R and R' denote organic radicals
H is hydrogen
C is carbon
S, element of the sulfur family
Cl, a halogen
=, unsaturated link
≠, conjugated or not The end-products of the depolymerization disclosed herein are essentially of the same consistency, softness, plasticity, viscosity as the original unsaturated molecules. However, chemically they have lost their unsaturation instability, gaining at the same time high reactivity due to the unilaterally grafted halides of the sulfur family. Thus, for instance, they quickly co-condensate with unsaturated molecules added subsequently to the product of depolymerization. This is illustrated by the stages (e) and (f) of the diagram.

Such physical and chemical properties are of practical value, for instance, in the manufacture of surface coatings, bonding agents, putties, etc., which by chemical grafting adhere with exception strength. Furthermore, such depolymerizates can serve as intermediates for chemical syntheses, etc.

The depolymerization of condensates subsequent to the total cross-linking which sets in upon the exhaustive saturation of the unsaturation in the organic sub-stratum by said halides added in excess of the requirement of a total cross-linking (more than one half equivalent of halide per equivalent of unsaturation) can be demonstrated, e.g., by the evolution of the consistency in arachidonic acid. Upon the treatment of the latter with various amounts of sulfur chloride, the fluidity, viscosity, and hardness of the reaction products reflects the molecular size of arachidonic vulcanizates which are proportional to the numbers of bridges cross-linking the originally monomeric molecules. The molecules or arachidonic acid contain 5 or 6 double bonds and 60 grams of it corresponds to 1.1 equivalents of unsaturation, yielding with some 70 grams of $S_2Cl_2$ (0.55 equilavent) the maximum of cross-linking (condensation), while larger amounts of sulfur chloride result in products of decreasing polymerity (viscosity), as obvious from Table I:

TABLE I.—REACTIONS OF INCREASING AMOUNTS OF SULFUR CHLORIDE WITH ARACHIDONIC ACID

| Grams of $S_2Cl_2$ per 60 grams of acid. | 26–32 | 40–64 | 72–100 | 106–120 | 126–154 |
|---|---|---|---|---|---|
| Characteristics of condensates. | Pasty | Brittle | Hard | Elastic | Plastic-liquid. |

It is immaterial for the execution of this invention whether or not the depolymerization treatment is distinctly separated in time or space from the initial cross-linking reaction, since the sulfur(Se, Te) halide in excess of ½ equivalent may be added directly to the orginal unsaturated compound, as for instance, in treating a Z–6 body soybean oil with various amounts of $SCl_2$ recorded in Table II:

TABLE II.—REACTIONS OF SULFUR DICHLORIDE WITH VARIOUS AMOUNTS OF A Z-6 BODY SOYBEAN OIL DISSOLVED IN BENZENE

| Grams of $SCl_2$ per 125 grams of oils | 6.7 | 13.4 | 20.0 | 26.8 | 33.4 | 40.0 | 47 | 53.5 | 60 |
|---|---|---|---|---|---|---|---|---|---|
| Time of gelation (minutes) | ∞ | 36 | 1.5 | 2.5 | 65 | 270 | 420 | 800 | ∞ |

The reactivity of the depolymerized products is obvious from the following: A depolymerized sulfenyl chloride prepared by treating 100 grams of arachidonic acid (1.8 equivalents of unsaturation), dissolved in 200 ml. of carbon tetrachloride, with 220 grams of $S_2Cl_2$ (0.75 equivalent in excess of the 0.9 equivalent required for the complete cross-linking), is a dark oil of medium viscosity, which reacts readily with unsaturated substances at room temperature by simple mixing, giving with:

| Added substance: | Nature of resulting product |
|---|---|
| Methanol, ethanol, propanol, butanol, amylol, hexanol | Tough, plastic masses. |
| Furfuryl alcohol | Hard. |
| Glycol | Do. |
| Diethyl ether | Glossy, hard. |
| Glycol ethyl ether | Glossy, plastic. |
| Urethane | Tough, plastic |
| Diethylene glycol ethyl ether | Do. |
| Acetone | Sticky oil. |
| Acetylacetone | Tough viscous mass. |
| Diisobutylene | Plastic—elastic. |
| Divinylbenzene (40%) | Do. |
| Turpentine | Do. |

The attainment of the state of depolymerization can be ascertained by boiling a sample with water. Depolymerization yields lightly colored spongy masses evolving $SO_2$, whereas regularly cross-linked condensates are neutral to water.

This behaviour of depolymerized condensates is similar to that of organic monosulfenyl-chlorides whose reactions with $H_2O$, $NH_3$, aromatic bases, $Na_2S$, $Na_2SO_3$, alkali hydroxides, $ClCH_2COOH$, $C_6H_5OH$, para cresol, trichlorophenol, naphtol, ethylene, acetone, esters, piperazine, have been studied by Conant (JACS 42, 585 (1920)), Friedländer (Berichte 55B, 3969 (1922)), Standard Oil (USP 2,422,276)), Fuson (J. Org. Chem. 11, 469 (1946)). However, while the depolymerized molecules of this invention carry two or more sulfenyl(Se, Te) halide groups and may be used anew for cross-linking condensation, as shown above this is not possible for the singly sulfo(Se, Te)-halogenated compounds described by Conant, Friedländer, Standard Oil and Fuson, which at the most may yield dimers (as shown in the next paragraph).

The structure of the depolymerized products contains sulfenyl(Se, Te) halides with end-standing reactive halogens which can be deduced by analogy from the following: By treating ethylene($H_2C=CH_2$) with sulfur chloride in equimolecular proportions (twice the amount of $S_2Cl_2$ which is required to produce the dimer

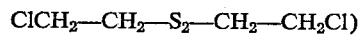

Conant (JACS 42, 585 (1920)) and Fuson (J. Org. Chem. 11, 469 (1946)) obtained monomeric

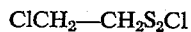

whose sulfenyl chloride (—$S_2Cl$) group reacts in the same way as unattached sulfur chlorides ($SCl_2$, $S_2Cl_2$) do, the structures of which are known to be be Cl—S—Cl and Cl—SS—Cl (Stevenson and Beach, JACS 60, 2972 (1938)).

Unsaturated constituents reacting with S(Se, Te) halides in terms of this invention are the structural elements which introduce into molecules the so-called "pi-electrons," binding forces resonating (moving) readily between atoms and promoting chemical reactivity (Glasstone "Textbook of Physical Chemistry" pp. 105 and 582 (1946)). So that any of the following, if part of an organic molecule, will act as an unsaturated constituent responsible first for the cross-linking and then for the depolymerization of condensates: Multiple bonds (double and triple) in olefines, acetylenes, napthalenes, anthracenes, etc.; saturated side chains of branched aliphatic compounds ;oxygen links in acetals, alcohols, aldehydes, esters, carboxylic acids, ketones, phenols, etc.; nitrogen links in amines, amides, imines, etc.; metal-organic groups; metal oxides such $Ag_2O$, BaO, CaO, CdO, $Cu_2O$, CuO, HgO, MgO, MnO, $MnO_2$, $Na_2O$, $Na_2O_2$, NiO, PbO, $Pb_2O$, SrO, ZnO; metalloids such as As, P (yellow and red), Si, Sb; metals such as Al, Bi, Cu, Fe, Hg, Sn, Zn; oxides, chlorides, sulfides like $AlCl_3$, $As_2O_3$, $As_2S_2$, $As_2S_3$, $Bi_4O_6$, $PCl_3$, $Sb_2O_3$, $CbCl_5$.

The organic molecules carrying these constituents may be straight chains, saturated or unsaturated chains, branched chains, cyclic, aromatic, mixed aromatic and aliphatic, heterocyclic, heterocyclic and aromatic, heterocyclic and aliphatic, or mixed aromatic, aliphatic, cyclic and heterocyclic.

The terms chalco-halide, S(Se, Te) halide, sulfur(Se, Te) halide applies to all halides of the sulfur family, for example, $SBr_2$, $SCl_2$, $S_2Br_2$, $S_2Cl_2$, $SCl_4$, $S_2I_2$, $S_2F_2$, $Se_2Cl_2$, $Se_2Br_2$, $SeBr_4$, $SeCl_4$, $TeCl_4$, $TeBr_4$ and others. Halides of other elements than S, Se and Te, for example $AlCl_3$, $PCl_3$, $SiCl_4$, $SnCl_4$, $TiCl_4$, $ZnCl_2$, otherwise known as powerful catalysts of polmerization, cannot be used for this kind of cross-linking and depolymerization.

Various unsaturated constituents may be present in the original molecules as long as two or more of them per molecule are available for the reactions (see Table III), TABLE III.—POLY-SULFENYL-CHLORIDES RESULTING FROM REACTING 100 GRAMS OF VARIOUS UNSATURATED COMPOUNDS WITH 20% AROMATIC SOLUTIONS OF SCl₂ AND S₂Cl₂

| Substance | Cause of Unsaturation | Amount of Chloride | Nature of Sulfenyl |
| --- | --- | --- | --- |
| Acetylacetone (undiluted) | Enolization [1] | Over 32 gr. SCl₂ | Red viscous liquid. |
| Butyl Rubber (5% aromatic solution) | Double bonds | 16 gr. SC₂ | Elastic, sticky. |
| Cyclicized Rubber | do | 120 gr. SCl₂ | Hard, reddish grey. |
| Glycol | Resonance | Over 600 gr. S₄Cl₂ | Yellow wax. |
| Glycolethylether | do | Over 16 gr. SCl₂ | Yellow paste. |
| Linoleic Acid (50% naphta solution) | Double Bonds | Over 32 gr. S₂Cl₂ | Brown paste. |
| Malonic Ester (undiluted) | Resonance | Over 32 gr. SCl₂ | Viscous liquid. |
| Pale Crepe Rubber (5% aromat. solution) | Double Bonds | 160 gr. S₂Cl₂ | Hard, yellowish. |
| Phenylene Diamine (fine powder) | Resonance | Over 16 gr. SCl₂ | Brown oil. |
| Resorcinol (fine powder) | do | 64 gr. SCl₂ | Brown viscous oil. |
| Saccharose (fine powder) | do | Over 16 gr. SCl₂ | Yellow viscous liquid. |
| Soybean Oil (undiluted) | Double Bonds | 200 gr. S₂Cl₂ | Viscous black oil. |
| Turpentine (undiluted) | do | 128 gr. SCl₂ | Yellow wax. |
| Urea (aromatic suspension) | Resonance | Over 16 gr. SCl₂ | Yellow viscous liquid. |
| Urea (saturated water solution) | do | 660 gr. S₄Cl₂ (undiluted) | Yellow paste. |

[1] According to modern views the unsaturation of organic molecules may result in structural "enolization," "resonance," "tautomerism."

The reacting substances may be employed each by itself or in combinations, for example oils with rubber, allyl monomers with alkyl-modified oils, etc.

Since the procedure described here requires the presence of condensable molecules and consists in reacting them with halides of the sulfur family in proportions exceeding the needs of total-cross-linking, it has nothing in common e.g. with: the making of viscous non-penetrating oils by thickening them with up to 7% S₂Cl₂; the manufacturing of highly condensed rubber substitutes from the same oils with some 30% of sulfur chloride; the so-called cold-vulcanization, where 1% or less of S₂Cl₂ react with rubber, producing in it a state of elasticity; the perchloromethyl-mercaptan Cl₃CSCl (USP 2,197,781); the di-chloro-ethylsulfenyl-chloride Cl₂CHS₂Cl (USP 2,484,061); the work of Calcott (USP 1,896,157), of Garvey (I. E. Ch. 29, 208 (1937)), of Herrmann (USP 1,627,157); the partly vulcanized butyl rubber of Sparks (USP 2,471,093).

Of all previous investigators Le Blank (Koll, Zeitschr. 33, 168 (1923)) has treated rubber with sufficient amounts of S₂Cl₂ to obtain a depolymerization of the total vulcanizate. However, he did not expect anything like a depolymerization to occur, and, due to unfavorable experimental conditions, he did not observe anything besides gelation of his 1% solutions, though, as shown below, rubber-sulfenyl-chloride solutions of higher concentrations than his remain permanently liquid.

Weber (The Chemistry of Rubber Manufacture, London (1926) p. 82) speaks of using an excess of sulfur chloride. However, he states clearly that his reaction products did not reach higher proportions of S and Cl than those of formula C₁₀H₁₆S₂Cl₂, even when an excess of S₂Cl₂ was added. It has been known for a long time that the structure of this composition is that of a totally cross-linked condensate (which has no unilaterally bound sulfenyl groups). Apparently Weber did not leave the excessive sulfur chloride long enough in contact with the cross-linked rubber to produce a depolymerization in terms of this invention.

Snelling's "Improved Factice" (USP 1,430,034) cannot contain depolymerizates in terms of this invention because otherwise the obtained product could not be used as substitute, i.e. compounded to rubber without immediate scorching (vulcanization during processing which renders the stock useless). Snelling seems to have treated linseed oil with sufficient amounts of sulfur chloride to produce depolymerization, however, without allowing enough time for the reaction to take place. Neither did depolymerization occur in the rubber sulfur chloride of Bernstein (Koll. Zeitschr. 11, 185 (1912)), whose statement (p. 191b, paragraph below the table), that: "On examining these analytical tables, one finds, that addition of S₂Cl₂ from 65.85 to 658% on the used rubber, results in insoluble products, which deviate very little from the constant value: chlorine 17.4% and sulfur 15.7%, i.e. ratios of chlorine and sulfur close to the theoretical," is conclusive in this respect. This theoretical composition is indicated by him as C₁₀H₁₆S₂Cl₂ (p. 187a), which is nothing more than an exhaustively cross-linked condensate.

Becker (Rec. Trav. Chim. Pays Bas 54, 52 (1935)) treated butadiene and isoprene with sulfur chloride in excess of ½ equivalent per double bond, however, since he clearly shows, that the prepared products correspond to the structures:

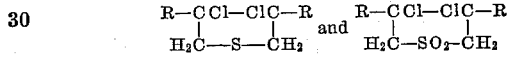

as well as CH₂Cl—CHCl—CHCl—CH₂Cl, he did not produce depolymerized cross-links.

All previous investigators failed to show for the reaction of sulfur chlorides with molecules containing more than one double bond, that the produced condensation attains a maximum for very definite proportions of the reactants; that amounts of sulfur chlorides exceeding this ratio cause depolymerization, bringing about lower consistencies: giving, for example, less and less viscous condensates in the measure as the dose of the halide is increased; that the resulting depolymerizates contain reactive sulfenyl halide groups and can be further co-condensed.

The depolymerization of the present invention may be carried out in the absence of a dispersing medium. However, the use of a solvent for the organic component, or for the halide, or for both has a marked influence on the rate of reaction and on the properties of the resulting products, depending on whether the solvent is aromatic, chlorinated, hydrogenated or aliphatic. Combinations of various liquids may be employed in order to attain various reaction velocities and degrees of depolymerization. Oxygen-containing solvents (esters, ethers, ketones) tend to react with the halide and may nullify the desired effect. Other substances may be used as auxiliary dispersing or peptizing agents for depolymerizates which for some reason may show the tendency for gelation (too small amounts of halides used, insufficient dilution, etc.), e.g., furfuryl alcohol, diacetone alcohol, carbinol, aniline, acetone, ethyl ether, gylcol ethers, pyridine. However, such a peptization is not the same as the depolymerization by halides of S(Se, Te).

EXAMPLES

The following examples show how the principles of the invention are applied in specific instances:

*Example I.—Poly-sulfenyl-chloride of natural rubber*

To a solution of 100 grams of "pale crepe" natural rubber in benzene (total volume 2000 ml.) is added a solution of 160 grams of sulfur dichloride in benzene (total volume 800 ml.). Though no precipitation occurs, the reaction is instantaneous, as can be seen from gelation times of smaller amounts of SCl$_2$:

| Grams of SCl$_2$ per 100 grams of rubber | 4 | 16 | 32 | 72 | 160 | 200 |
|---|---|---|---|---|---|---|
| Gelation times in minutes | 80 | 5 | 0.1 | 1 | ∞ | ∞ |

Using 160 grams SCl$_2$ the obtained poly-sulfenyl-chloride of rubber remains dispersed indefinitely. On evaporation of the solvent, cream-colored, hard, more brittle than elastic depolymerizates are obtained.

*Example II.—Poly-sulfenyl-chloride of butyl rubber*

To a solution of 100 grams of butyl rubber in sufficient toluene to give a total volume of 2000 ml., a solution of 16 grams of sulfur dichloride, in sufficient toluene to give a total volume of 80 ml. is added. The reaction is somewhat slower than with natural rubber, so that the end of the condensation is reached in approximately ½ hour; however, no thickening or gelation occurs, which is the case when mixtures with smaller amounts of sulfur chloride are reacted. The condensate, isolated e.g. by evaporation of the solvent, is very elastic, somewhat tacky and yields transparent glossy films.

*Example III.—Poly-sulfenyl-chloride of cyclicized rubber*

To a solution of 100 grams of cyclicized rubber, for instance "Pliolite SL 5," in sufficient aromatic solvent to give a total volume of 2000 ml., is added a solution of 120 grams of sulfur dichloride in an aromatic solvent (total volume 600 ml.). The rate of reaction is of the same order of magnitude as with pale crepe rubber. The depolymerizate, isolated for instance by evaporation of the solvent, yields hard, brittle, glossy films of reddish grey color.

*Example IV.—Poly-sulfenyl-chloride of turpentine*

If to undiluted turpentine various amounts of a 20% sulfur chloride solution are added, a vivid reaction is observed but no gelation. However, the nature of the condensate, isolated for instance by evaporation of the solvent, indicates distinctly the presence of an inflection point, and places the state of depolymerization beyond approximately 128 grams per 100 grams of turpentine:

| Grams of SCl$_2$ | 8 | 64 | 128 | 256. |
|---|---|---|---|---|
| Nature of the condensate. | Light oil creme. | Heavy oil creme. | Wax yellow. | Thick oil bright yellow. |

*Example V.—Poly-sulfenyl-chloride of acetylacetone*

If undiluted acetylacetone is treated with various amounts of a 20% solution of SCl$_2$ in an aromatic solvent such as benzene or toluene, no gelation is observed. However, the properties of the resulting condensates, isolated for instance by evaporation of the solvent, show distinctly an inflection point, beyond which depolymerization sets is:

| Grams of SCl$_2$ per 100 gr. of acetylacetone. | 2 | 16 | 32 | 128. |
|---|---|---|---|---|
| Properties of the condensate. | Waxy, long crystals. | Harder, less dist. crystals. | Resinous hard mass. | Cherry red, thick liquid. |

Thus, using more than 32 grams of sulfur dichloride per 100 grams of acetylacetone, the poly-sulfenyl-chloride is obtained.

*Example VI.—Poly-sulfenyl-chloride of diacetone alcohol*

When undiluted diacetone alcohol is treated with various amounts of sulfur dichloride (e.g. a 20% solution in benzene), no gelation occurs. However, if by evaporation of the solvent e.g. at room temperature, the condensate is recovered, one finds a distinct point in its consistency, a maximum, beyond which lies the region of depolymerization. Approximately 500 grams of SCl$_2$ per 100 grams of diacetone alcohol correspond to this optimum of condensation:

| Grams of SCl$_2$ per 100 grams of diacetone alcohol. | 4 | 64 | 500 | 1,000. |
|---|---|---|---|---|
| Properties of the condensate. | Liquid dark viscous mass | Tacky | Elastic condensate | Plastic. |

*Example VII.—Poly-sulfenyl-chloride of malonic ester*

If undiluted ethyl malonate is treated with SCl$_2$ no gelation is observed, as already stated in the case of turpentine and diacetone alcohol. Also, as in the case of those two substances, the nature of the condensate, isolated by evaporation of the solvent, indicates very distinctly the evolution toward an optimum of consistency, after which the depolymerization state is observed:

| Grams of SCl$_2$ per 100 grams ethyl malonate. | 2 | 16 | 32 | 64. |
|---|---|---|---|---|
| Nature of the condensate | Hard film and unchanged condensate | Elastic film. | Viscous liquid. | |

Thus, in order to obtain poly-sulfenyl-chlorides of ethyl malonate, more than 32 gr. of SCl$_2$ per 100 grams of the ester are required.

*Example VIII.—Poly-sulfenyl-chloride of glycol*

A mixture of 64 grams sulfur (2 mols) with 136 grams of S$_2$Cl$_2$ (1 mol) and 0.04 gram of iodine is heated, for instance, to boiling during 6 hours. The iodine acting as catalyst, the compound S$_4$Cl$_2$ is formed. On addition of 31 grams glycol (½ mol) to this tetrasulfo-dichloride, a greyish yellow waxy mass is formed, which can be washed for instance with naphta, benzene, acetone; if boiled with water, it yields a bright yellow plastic mass, insoluble in CS$_2$.

*Example IX.—Poly-sulfenyl-chloride of resorcinol*

By treating finely powdered resorcinol with various amounts of sulfur dichloride (for instance a 20% solution in toluene), and removing the solvent after some standing (for instance 36 hours), one produces condensates the general characteristic of which is a progressive approach toward a peak in consistency, after which depolymerization can be identified:

| Grams of SCl$_2$ per 100 grams resorcinol. | 4 | 16 | 32 | 64 | 128. |
|---|---|---|---|---|---|
| Characteristics of the condensates. | Resorcin granules cemented by condensate. | Mainly red brown oil. | Red brown plastic mass. | Mainly red brown viscous oil. | Viscous red brown oil. |

The proportion of SCl$_2$ to be used in order to obtain poly-sulfenyl-chlorides of resorcinol is more than 32 grams per 100 grams of the organic material.

*Example X.—Poly-sulfenyl-chloride of phenylene diamine*

1,4 phenylene diamine is treated with various amounts of sulfur dichloride (for instance a 20% solution in benzene). After 24 hours' standing the reaction products are treated with water giving:

| Grams of SCl$^2$ per 100 grams phenylenediamine | 2 | 8 | 16 | 64. |
|---|---|---|---|---|
| Properties of the condensate. | Violet soluble in water, some grey plastic. | | Grey plastic fusible to black tar. | Brown oil. |

Phenylene diamine being isoluble in benzene, the reaction takes place between small solid particles of the organic material and dissolved $SCl_2$—it is consequently heterogenous. Using more than 16 grams of $SCl_2$ per 100 grams of phenylene diamine, one obtains poly-sulfenyl-chlorides.

Example XI.—Poly-sulfenyl-chloride of saccharose

Finely powdered sugar is treated with various amounts of, for instance, a 20% benzene solution of $SCl_2$. The reaction is heterogenous since sugar is not soluble in benzene, and thorough mixing of the reagents is helpful. After 24 hours standing and having evaporated the solvent, one obtains, besides somewhat caramelized (but otherwise unchanged) sugar, condensation products which show an evolution towards a highly condensed elastic yellowish mass, corresponding approximately to a proportion of 100 grams of sugar to 16 grams of $SCl_2$. The condensates beyond the transition point are yellow, more or less viscous oils.

Example XII.—Poly-sulfenyl-chloride of urea

Finely powdered urea is treated with various amounts of sulfur dichloride (for example a 20% solution in benzene) and, after standing for some 36 hours at room temperature, by evaprating the solvent, one obtains condensates showing clearly an evolution towards an inflection point and a region of depolymerization, for quantities of more than approximately 16 grams of $SCl_2$ per 100 grams of urea:

| Grams of $SCl_2$ per 100 grams of urea. | 4 | 16 | 32 | 64. |
|---|---|---|---|---|
| Properties of the condensate | Urea grains cemented by condensate. | Plastic mass. | Plastic with viscous oil. | Viscous yellow oil. |

Example XIII.—Co-condensates of poly-sulfenyl-urea with various unsaturated substances A cold saturated water solution of 100 grams of urea is mixed with 660 grams of $S_4Cl_2$ (prepared for instance by boiling for 6 hours of 212 grams of $S_2Cl_2$ with 448 grams of elemental sulfur and 0.132 grams of elemental iodine). After standing for some time a bright yellow, pasty mass is obtained.

Co-condensation of this urea-sulfenyl-chloride e.g. by boiling at atmospheric pressure with various unsaturated substances gives: With acetone a sticky mass; with methanol a yellow somewhat plastic substance; with "nonenes" a yellowish elastic condensate; with urea (saturated aqueous solution) a hard product; with water a light colored mass resistant to the action of solvents. These reactions were performed with the unsaturated components in excess of the stoichiometric requirements by the poly-sulfenyl-chloride, the co-condensates being obtained in separate phase as precipitates or immiscible liquids.

Example XIV.—Poly-sulfenyl-chloride of soybean oil and co-condensates with various unsaturated substances Treatment of 50 grams of soybean oil with 100 grams of sulfur monochloride produces instantaneous gelation. However, the condensate reliquefies on standing without any further addition of chemicals (approximately 48 hours) yielding a viscous black oil which can be kept indefinitely. This poly-sulfenyl-chloride of soybean oil reacts as follows on mixing with unsaturated substances: glycerol and glycol-ethyl-ether yield tacky co-condensates; pyridine a leather-like substance; ammonia reacts suddenly to a dull brown mass; water and ethyl-alcohol yield elastic rubber-like substances of dull olive color. In this instance again the unsaturated components of co-condensation were applied in amounts exceeding the saturation requirements of the poly-sulfenyl-chloride and the reaction products were identified in separate phases.

Co-condensation opens avenues for the practical use of poly-sulfenyl-chlorides. For example, I was able to develop poly-sulfenyl-chloride varnishes for rubber goods (natural and synthetic), which are elastic, extremely adhesive, glossy and resistant to wear. Being colorless, they can be used even on pastel shade stocks. Requiring no heat treatment and drying quickly by co-condensation, they can be applied by dipping, brushing, or spraying, to vulcanized goods. Other poly-sulfenyl-chlorides can be used for bonding both unvulcanized and vulcanized rubber articles. Here again no heating is required and the strength of the seams is higher than the resistance of the material itself, even between heterogenous substances like natural rubber, GR–S, GR–I, etc.

As mentioned above, treatment of drying oils with some 30% sulfur chloride produces substitute (Factice). This latter is being used industrially as a plasticizer in rubber goods. Such practice of blending oil-sulfur-chloride-condensates with polyolefines is, however, no co-condensation with poly-sulfenyl-chlorides in terms of this invention. For such co-condensation the substitutes ought to contain reactive sulfur(Se, Te) groups, which, if they were present, would immediately co-condense with rubber, scorching it on the rubber mill, rendering it hard and unutilizable, rather than plastic. This necessarily applies to the "Improved Factice" of Snelling (USP 1,430,034).

In summary, the process of my invention yields substances whose essential feature is a degree of condensation beyond the maximum possible for the given organic substance. According to it, the condensation products of unsaturated compounds with the halides of the sulfur family pass physically through the stage of maximum cross-linking to a stage characterized by a lower degree of polymerization. If carried out to the fullest extent, such a depolymerization restores the initial size of the molecules, as it was prior to the cross-linking by S(Se, Te)halides; however one does not always go so far. The process may be carried to any point between the maximum cross-linking and the complete depolymerization. As to the actual consistency of the end-product, it will vary from the plasticity of petrolatum, or even the elasticity of raw rubber to the fluidity of a middle oil, depending on the initial state of the organic material. In each instance, however, the depolymerized product will be less viscous, more plastic, lower melting, and more soluble, than at the point of maximum condensation which is obtained with smaller amounts of the halides of S(Se, Te).

Chemically, the compounds depolymerized by the process of my invention are different from condensates partly or exhaustively cross-linked by S(Se, Te)halides. As soon as the amount of the latter exceeds ½ equivalent per equivalent of original unsaturation, the completely cross-linked condensates, correspond to the formula: $X_NR$—$(Z_m)_N$—$RX_N$ (in which X is a halogen; R is an organic radical; Z=S, Se, Te; $m$ is 1, 2, 3 or 4; N is a whole number larger than one), begin to depolymerize. Unilaterally bound —$Z_mX$ groups will appear in them, their number increasing with added $Z_mX_2$ until, in the case of complete depolymerization, all unsaturated groups of the original radical R are substituted by $-Z_mX$, leading over the structure:

$$(XZ_m)_nRX_N-(Z_m)_{N-n}-X_NR(Z_mX)_n \text{ to } (XZ_m)_N-RX_N$$

where $n$ is a whole number smaller than $N$.

Since all unsaturated groups of the organic molecule are consumed, the obtained depolymerizates are stable. On the other hand, however, their principal chemical characteristic is the presence of highly reactive $-Z_mX$ groups bound to R under elimination of only one X atom. This makes them of interest for numerous syntheses, one class of which is the co-condensation with compounds carrying unsaturated constituents. Such co-condensation yields structures as represented by formulas:

$$X_NR-(Z_m)_N-R'X_N$$

and $$X_nR'(Z_m)_n-X_NR-(Z_m)_{N-n}-RX_N-(Z_m)_nR'X_n$$

neither of which can be obtained by mixed cross-linking of the unsaturated molecules (R) and (R') with $Z_mX_2$, since this latter results in mixtures of:

$$X_NR-(Z_m)_N-R'X_N, X_NR-(Z_m)_N-RX_N$$

and $$X_NR'-(Z_m)_N-R'X_N$$

unfractionable due to high molecularity.

To those skilled in the art to which this invention relates, many changes in formulation and widely differing embodiments and applications of the procedure will suggest themselves without departing from the spirit of my discovery and of its scope. The disclosure and the description herein are purely illustrative and are not intended to be in any sense limitative.

I claim:
1. A process for depolymerizing polymers which comprises:
    (a) Reacting an organic monomer containing at least two unsaturated constituents, said monomer being selected from the group consisting of ethylenically unsaturated organic monomers, acetylenically unsaturated organic monomers, organic monomers containing unsaturated oxygen linkages and organic monomers containing unsaturated nitrogen linkages with exactly one half equivalent per equivalent of monomeric unsaturation of a member selected from the group consisting of sulfur halides, selenium halides, and tellurium halides to form an exhaustively cross-linked polymer.
    (b) Depolymerizing said exhaustively cross-linked polymer by further reaction with additional quantities of said halides beyond the requirements for exhaustive cross-linking to produce by the splitting of said cross-links unilaterally bound highly reactive halide side chains.
2. The process of claim 1 in which the reactive side chains consist of sulfur halides.
3. The process of claim 1 in which the reactive side chains consist of sulfur chloride.
4. The process of claim 1 in which the organic monomers contain ethylenically unsaturated double bonds.
5. The process of claim 1 in which the organic monomers contain acetylenically unsaturated linkages.
6. The process of claim 1 in which the organic monomers contain unsaturated oxygen linkages.
7. The process of claim 1 in which the organic monomer contains unsaturated nitrogen links.
8. The process of claim 1 in which the required amount of halide for both steps (a) and (b) is added in one portion.
9. The process of claim 1 in which the required amount of halide for both steps (a) and (b) is added in several fractional portions.
10. The process of claim 1 carried out in the presence of an inert organic solvent.
11. The process of claim 1 carried out in the presence of an inert aromatic solvent.
12. The process of claim 1 carried out in the presence of an inert aliphatic solvent.
13. The process of claim 1 carried out in the presence of an inert hydrogenated solvent.
14. The process of claim 1 carried out in the presence of an inert halogenated solvent.
15. The process of claim 1 carried out in the absence of solvents.

References Cited by the Examiner

UNITED STATES PATENTS

| | | | |
|---|---|---|---|
| 1,978,829 | 10/1934 | Gray | 260—1 |
| 2,114,314 | 5/1938 | Patrick | 260—79 |
| 2,152,828 | 4/1939 | Thomas | 260—94 |

OTHER REFERENCES

Rubber Age, Volume 83, September 1958, TS 1870 R6 (pp. 993–995).

WILLIAM H. SHORT, *Primary Examiner.*

HAROLD N. BURSTEIN, *Examiner.*

A. D. RICCI, H. E. SCHAIN, *Assistant Examiners.*